US008366951B2

(12) United States Patent
Morisue et al.

(10) Patent No.: US 8,366,951 B2
(45) Date of Patent: Feb. 5, 2013

(54) LIQUID DISCHARGE HEAD AND METHOD OF MANUFACTURING A SUBSTRATE FOR THE LIQUID DISCHARGE HEAD

(75) Inventors: Masafumi Morisue, Tokyo (JP); Takumi Suzuki, Yokohama (JP); Masahiko Kubota, Tokyo (JP); Ryoji Kanri, Zushi (JP); Akihiko Okano, Kawasaki (JP); Atsushi Hiramoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 319 days.

(21) Appl. No.: 12/629,238

(22) Filed: Dec. 2, 2009

(65) Prior Publication Data

US 2010/0156990 A1 Jun. 24, 2010

(30) Foreign Application Priority Data

Dec. 19, 2008 (JP) ................................ 2008-323787

(51) Int. Cl.
*G01D 15/00* (2006.01)

(52) U.S. Cl. ........................................................ 216/27

(58) Field of Classification Search .................... 216/27; 347/47

See application file for complete search history.

(56) References Cited

U.S. PATENT DOCUMENTS

| | | | |
|---|---|---|---|
| 6,137,510 | A | 10/2000 | Sato et al. |
| 6,386,686 | B1 | 5/2002 | Kubota et al. |
| 7,452,474 | B2 | 11/2008 | Komuro et al. |
| 7,485,412 | B2 | 2/2009 | Okano et al. |
| 2006/0044352 | A1 | 3/2006 | Bresciani et al. |
| 2006/0094200 | A1 | 5/2006 | Leith et al. |

FOREIGN PATENT DOCUMENTS

| | | | |
|---|---|---|---|
| EP | 0 609 012 | A2 | 8/1994 |
| JP | 2001-018385 | | 1/2001 |
| JP | 2007-210242 | | 8/2007 |
| JP | 2008-260151 | | 10/2008 |

OTHER PUBLICATIONS

English translation of Japanese Laid-open Patent Application No. 2007-210242.
Chinese Office Action dated May 5, 2011, which issued in Chinese Patent Application No. 200910259421.5.
Office Action dated Jul. 19, 2012, in Korean Application No. 10-2009-0123747.
Communication dated Oct. 17, 2012, forwarding a European Search Report in European Application No. 09178533.7-1251/2202076.

*Primary Examiner* — Lamson Nguyen
(74) *Attorney, Agent, or Firm* — Fitzpatrick, Cella, Harper & Scinto

(57) ABSTRACT

A liquid discharge head includes an Si substrate which is provided with an element for generating energy used in discharging a liquid and a liquid supply port which is provided to pass through the Si substrate from a first surface to a rear surface so as to supply a liquid to the element. A method of manufacturing the substrate includes: forming a plurality of concave portions on the rear surface of the Si substrate of which a plane orientation is {100}, the concave portions facing the first surface and aligned in rows along a <100> direction of the Si substrate; and forming a plurality of the liquid supply ports by carrying out a crystal axis anisotropic etching on the Si substrate through the concave portions using an etching liquid of which an etching rate of the {100} plane of the Si substrate is slower than that of the {110} plane of the Si substrate.

5 Claims, 7 Drawing Sheets

LIQUID DISCHARGE HEAD AND METHOD OF MANUFACTURING A SUBSTRATE FOR THE LIQUID DISCHARGE HEAD

BACKGROUND OF THE INVENTION

1. Field of the Invention

The present invention relates to a liquid discharge head and a method of manufacturing the liquid discharge head.

2. Description of the Related Art

FIG. 9 illustrates a diagram schematically illustrating a typical liquid discharge head which is used in an ink jet printing scheme. The liquid discharge head is provided with fine discharge ports 103 for discharging a liquid onto an Si substrate, flow paths 104 for connecting the discharge ports 103, and liquid discharge energy generating elements 101 which are provided on a part of the flow paths 104. On the Si substrate, a supply port 701 is formed which is connected to the flow paths 104. The liquid discharge head is manufactured by a method disclosed in U.S. Pat. No. 6,137,510, for example.

In Japanese Patent Application Laid-Open No. 2007-210242, there is disclosed a method of forming the supply ports in which guide holes are formed in the substrate by a laser process, and then a Silicon-crystal axis anisotropic etching is carried out so as to form the supply ports.

On the other hand, when it is assumed, as it is illustrated in FIG. 12, that the liquid discharge head includes independent supply ports 105 and the flow paths 104 which are connected to the discharge ports 103 and symmetrically disposed with respect to the energy generating elements 101, the following problems can be considered.

Here, the independent supply port represents a supply port which is independently connected to the flow path 104 connecting to the discharge port 103. In addition, a sub flow path represents a flow path in which the flow paths 104 are connected in two directions symmetrical to the discharge port 103. In addition, in a pillar-shaped Si (hereinafter, referred to as an Si pillar) 106 which is interposed between the independent supply ports, electric lines may be routed to the liquid discharge energy generating element.

Further, in this specification, a crystal orientation will be described using a Miller index. Surfaces which are crystallographically equivalent, for example, (100) and (010), are denoted as {100}. In addition, orientations which are crystallographically equivalent, for example, [100] and [010], are denoted as <100>.

In order to manufacture the independent supply port 105 of the liquid discharge head having a shape illustrated in FIG. 12, using a method described in Japanese Patent Application Laid-Open No. 2007-210242, the cross section of the supply port is formed in a rhombic shape in the vertical direction on the substrate surface. Even though the opening of the supply port can be formed to be small, when the independent supply ports are formed at high density, the width of the Si pillar between the two nearest supply ports becomes narrower, so that the strength of the head may be weakened. In addition, there may be a case where it is difficult to efficiently radiate toward the substrate the heat energy generated from the liquid discharge energy generating element, so that there is demand for improvements.

There is disclosed a case where after the guide holes are formed, the Si-crystal axis anisotropic etching is carried out and walls of the supply ports are formed on {110} plane. This is because a groove is easily formed in a <110> direction by the Si-crystal axis anisotropic etching with good accuracy for the purpose of forming a space which is a typical common liquid chamber (see FIG. 13). For this reason, the discharge ports of the liquid discharge head according to the related art are generally aligned in the <110> direction.

However, under a large number of conditions, it is known that the Si-crystal axis anisotropic etching rate of the {110} plane is faster than the etching rate of the {100} plane or the etching rate of the {111} plane which is another typical crystal orientation. For this reason, when the independent supply ports corresponding to the discharge ports aligned in the <110> direction according to the related art are formed along the <110> direction, there is a concern that the width of the Si pillar between the two nearest supply ports may be formed narrower than a desired width by the high etching rate to the <110> direction.

SUMMARY OF THE INVENTION

The present invention has been made to address the above-mentioned problems, and an object is to provide a liquid discharge head in which Si portions between the adjacent supply ports among the supply ports provided in the Si substrate are formed to have a proper width. In addition, another object is to provide a method of manufacturing the liquid discharge head, through which a liquid discharge head can be obtained with high accuracy.

An example of the invention is a method of manufacturing a substrate for a liquid discharge head which includes an Si substrate which is provided with an element, which generates energy to be used for discharging a liquid, on a first surface and a liquid supply port which is provided to pass through the Si substrate from the first surface to the rear surface thereof so as to supply a liquid to the element. The method includes: forming a plurality of concave portions on the rear surface of the Si substrate of which a plane orientation is {100} so as to being aligned in rows along a {100} direction of the Si substrate, the concave portions facing the first surface; and forming a plurality of the liquid supply ports by carrying out a crystal axis anisotropic etching on the Si substrate through the concave portions using an etching liquid of which an etching rate of the {100} plane of the Si substrate is slower than an etching rate of the {110} plane of the Si substrate.

According to the invention, the liquid discharge head can be provided such that the Si portions between the adjacent supply ports among the supply ports provided in the Si substrate are formed to have a proper width.

Further features of the present invention will become apparent from the following description of exemplary embodiments with reference to the attached drawings.

BRIEF DESCRIPTION OF THE DRAWINGS

FIGS. 10A, 10B, 100, 10D, 10E and 10F are cross-sectional views schematically illustrating an embodiment of the invention used to describe the order of processes.

DESCRIPTION OF THE EMBODIMENTS (Embodiment 1)

Figure 1:
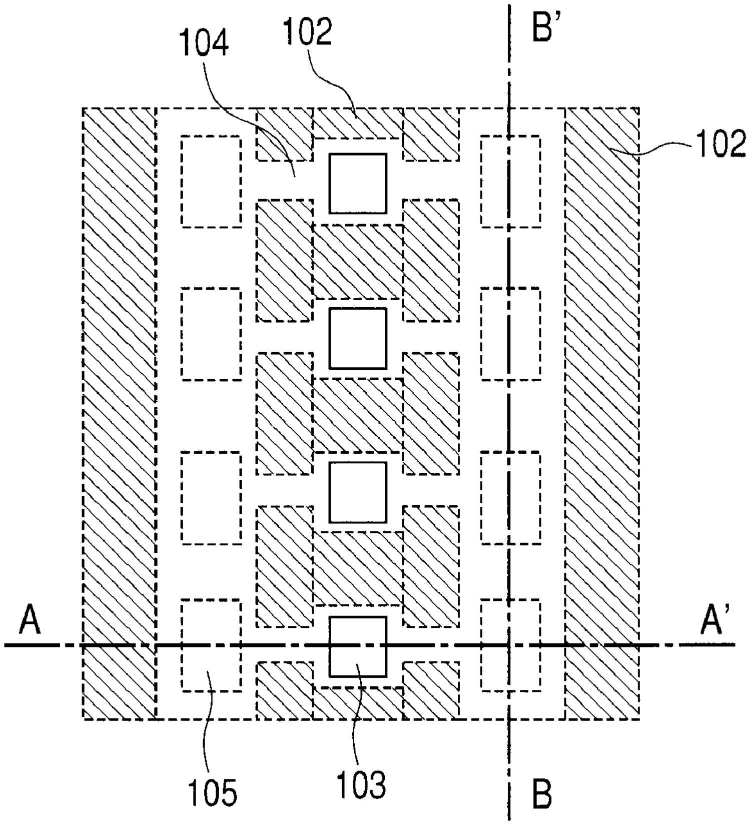
FIG. 1 is a diagram schematically illustrating a liquid discharge head which is manufactured according to the invention.
Figure 2:
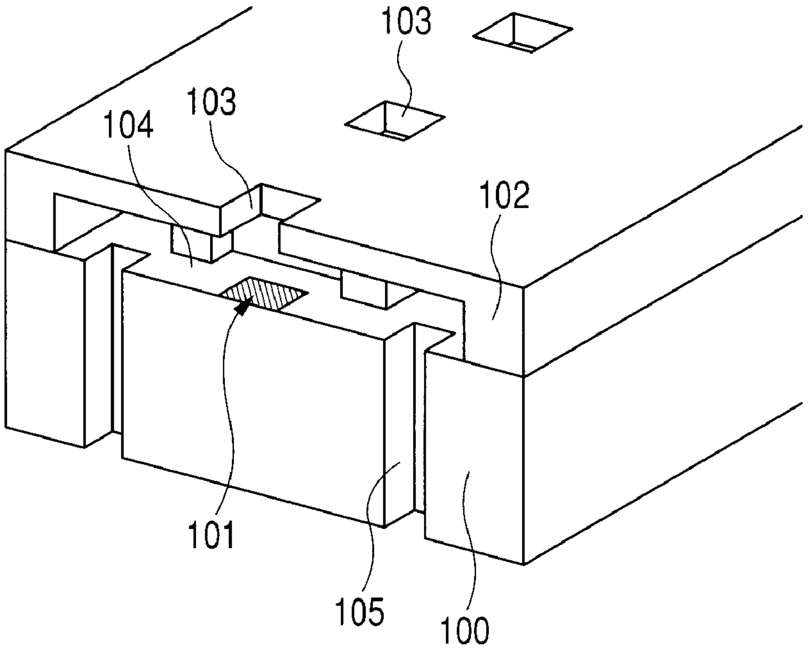
FIG. 2 illustrates a perspective view illustrating the cross section of the liquid discharge head taken along the line A-A' in FIG. 1.

FIG. 1 is a diagram schematically illustrating the liquid discharge head manufactured according to the invention when it is viewed from the discharge surface side. FIG. 2 illustrates a perspective view illustrating the cross section of the liquid discharge head taken along the line A-A' in FIG. 1. On the Si substrate 100 having the {100} plane on its surface, the liquid discharge energy generating elements 101 are provided. Further, the discharge ports 103 for discharging the liquid and the flow paths 104 for holding the liquid are formed using a nozzle material 102. In addition, the plural supply ports 105 connected to the flow paths 104 are formed in the Si substrate 100.

Figure 3A:
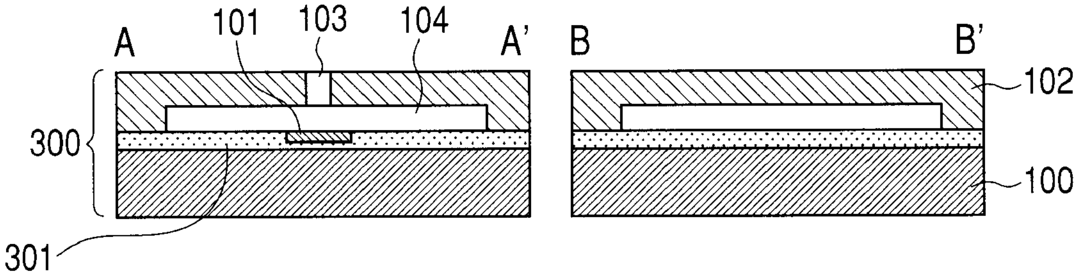
FIGS. 3A, 3B and 3C are cross-sectional views schematically illustrating an embodiment of the invention used to describe the order of processes.
Figure 3B:
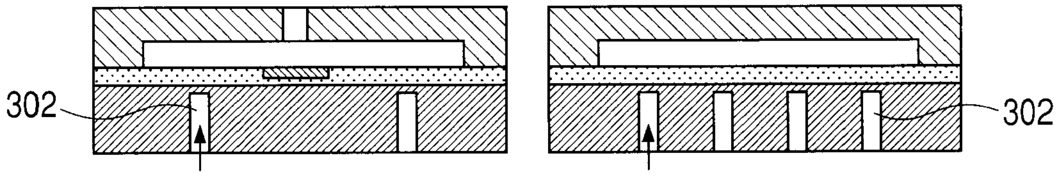
Figure 3C:
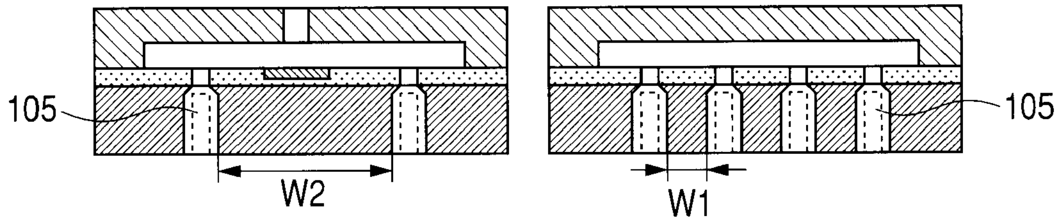

The shape of the present invention will be described with reference to FIGS. 3A to 3C, 4, and 5A to 5C. FIGS. 3A to 3C are diagrams schematically illustrating the cross sections (figures on the left side) taken along the line A-A' and the cross sections (figures on the right side) of the liquid discharge head taken along the line B-B' in FIG. 1 which are illustrated in the order of processes.

First, the substrate 300 is prepared (see FIG. 3A). In the substrate 300, the liquid discharge energy generating elements 101 are provided on the Si substrate 100 having the {100} plane, and the discharge ports 103 and the flow paths 104 are formed. In addition, a passivation film 301 is provided in the substrate 300. The passivation film 301 is a film formed by a process for manufacturing transistors for driving the liquid discharge energy generating elements 101. In addition, as a component, the passivation film 301 is formed of a silicon oxide film, a silicon nitride film, or their laminated structure. The passivation film 301 may be formed all over the surface of the Si substrate 100, or may be formed in a structure in which some portions are partially removed.

Figure 4:
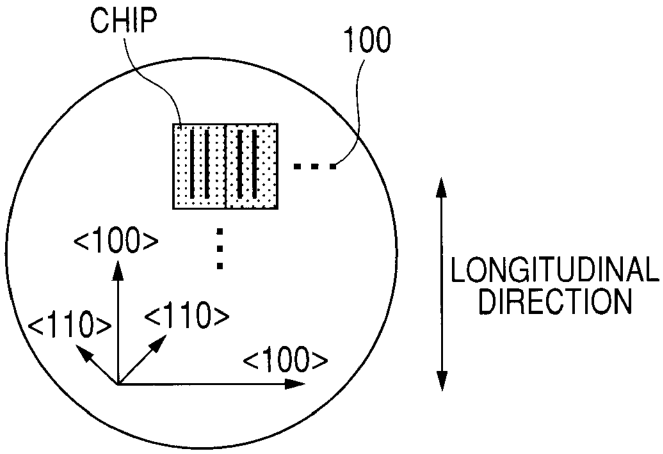
FIG. 4 is a diagram schematically illustrating an embodiment of the invention.

In addition, the discharge ports 103 and the flow paths 104 in the substrate 300 may be manufactured by the method according to the related art. At this time, the chips are aligned such that the longitudinal direction of the discharge port array is in the <100> direction on the Si substrate 100 of the {100} plane as illustrated in FIG. 4.

Next, guide holes 302 are formed using a laser beam such that the Si substrate 100 is removed from the rear surface of the Si substrate (the surface opposite to the surface on which the flow paths 104 are formed) (see FIG. 3B), (the first Si removal process). A wall surface of the second liquid supply port which is a {100} plane is provided on the rear surface of a wall surface of the first liquid supply port which is a {100} plane. At this time, the guide holes 302 are formed as concave portions such that the two nearest guide holes 302 are aligned in the <100> direction of the crystal axis on the Si substrate 100.

At this time, there is a need to control the depth to be formed by the laser process so as not to reach the passivation film 301. This is because when the laser process reaches the passivation film 301, the passivation film 301 and the nozzle material 102 formed thereon may be damaged in some cases. Further, the value of the processed depth is determined in consideration of deviations in depth formed by the laser process. The interval between the tip end of the guide hole 302 as the concave portion and the passivation film 301 is suitably 5 μm or more from the point of view of preventing damage to the nozzle material 102 in the laser process.

The laser beam used in the laser process is not particularly limited in its wavelength, the pulse time, and the spot shape of the laser irradiation as long as the Si substrate can be effectively removed. In this case, the spot shape of the laser irradiation is generally a circular shape, which is preferable in terms of cost. When the circular shape is used as the spot shape of the laser irradiation, the diameter of the guide hole 302 to be formed is suitably in a range from 15 μm to 35 μm. In addition, the width of the Si pillar between the two nearest guide holes 302 is suitably in a range from 50 μm to 70 μm. This is because the supply ports can be formed at high density by a second Si removal process which will be described later, and the strength of the liquid discharge head to be obtained can be enhanced.

Next, using an etchant (etching liquid) based on tetra methyl ammonium hydroxide (TMAH), the Si-crystal axis anisotropic etching is carried out, so that a part of the space of the supply port reaches the passivation film 301 (second Si removal process).

At this time, the etching is carried out under the condition that the etching rate of the {100} plane is smaller than the etching rate of the {110} plane. This condition of the etching rate can be satisfied by properly adjusting various parameters such as TMAH concentration or temperature. For example, when the TMAH concentration is in a range from 17.5% to 25% and the etching temperature is in a range from 70° C. to 90° C., the condition of the etching rate can be suitably satisfied.

Further, the etchant of the Si-crystal axis anisotropic etching is not limited to the TMAH solution. In addition to the etchant based on an alkali solution such as TMAH or KOH (potassium hydroxide), the etchant is not limited as long as the etchant has the etching rate of a crystal plane which satisfies the etching rate of the {100} plane being smaller than the etching rate of the {110} plane.

Thereafter, the passivation film 301 is removed from the rear surface by chemical etching or by wet etching so as to form the independent supply ports 105 which are connected to the flow paths 104 (see FIG. 3C).

Figure 5A:
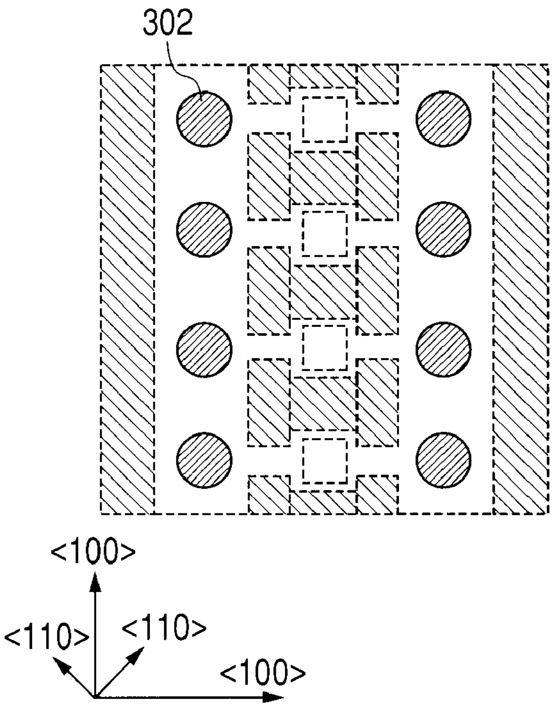
FIGS. 5A, 5B and 5C are diagrams illustrating formation of independent supply ports by Si-crystal axis anisotropic etching of the invention.
Figure 5B:
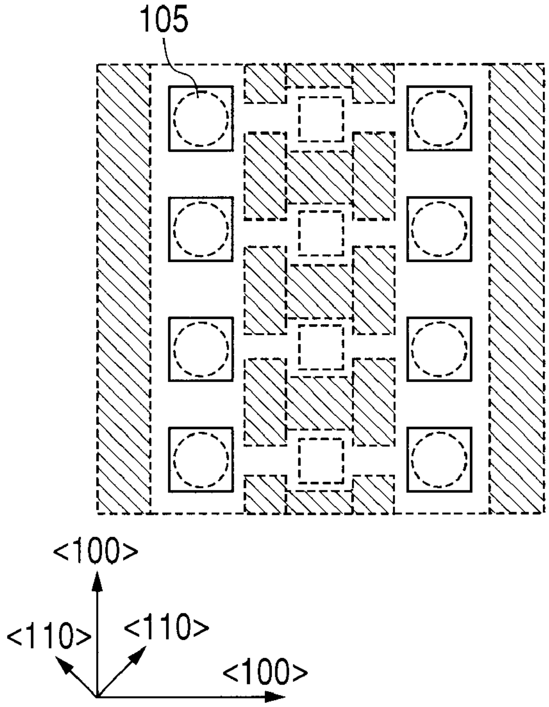
Figure 5C:
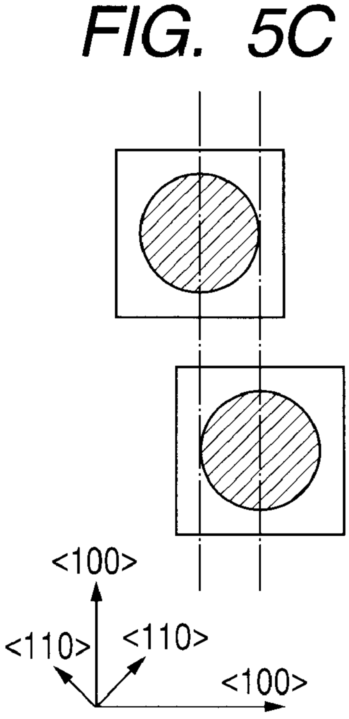

Here, the procedure of forming the supply port by the Si-crystal axis anisotropic etching will be described in detail with reference to FIGS. 5A to 5C. FIGS. 5A to 5C are diagrams schematically illustrating liquid discharge head when it is viewed from the rear surface of the substrate. The discharge ports and the flow paths formed on the surface of the substrate are illustrated with a dotted line.

As illustrated in FIG. 5A, the laser process is carried out on positions of the Si substrate to which the flow paths formed on the surface can be connected from the rear surface, so that the guide holes 302 are formed. At this time, the two nearest guide holes are formed to be aligned in the <100> direction with respect to the Si-crystal axis.

Next, the Si-crystal axis anisotropic etching is carried out under the condition that the etching rate of the {100} plane is smaller than the etching rate of the {110} plane. As illustrated in FIG. 5B, the {100} plane with a low etching rate is formed as the side surface of the independent supply port 105.

Further, forming the guide holes 302 to be aligned in the above-mentioned <100> direction does not mean that all the processing centers are aligned in the <100> direction. After the Si-crystal axis anisotropic etching is carried out, the distance between the independent supply ports 105 may be disposed to be defined in the <100> direction. For example, as illustrated in FIG. 5C, the center positions of two guide holes 302 may deviate from the <100> axis.

At this time, the width of the Si pillar between the supply ports can be expressed as W1 or W2 illustrated in FIG. 3C. Then, the width W1 or W2 of the Si pillar is determined by a distance of the {100} plane which is generated by the crystal axis anisotropic etching.

Since the supply ports 105 are necessarily formed at high density, the pitch of the array of the supply ports 105 is typically narrowed with respect to the longitudinal direction so that W1 is smaller than W2.

On the surface of the Si pillar with a width of W1, lines may be formed to electrically connect the liquid discharge energy generating elements 101 and the semiconductor elements for driving the liquid discharge energy generating elements 101 in some cases. In addition, the Si pillar plays a central role in transferring the heat generated from the liquid discharge energy generating elements 101 to the substrate.

From the point of view of the structural strength, the electrical reliability, and the thermal stability, it is suitable for W1 to be stably formed to have a value which is as large as possible. According to this embodiment, since the width of the Si pillar between the supply ports is defined by the {100} plane with a low etching rate, it has the effect that the width of the Si pillar can easily be formed to be large. In this embodiment, for example, W1 is in a range from 35 μm to 50 μm, which is suitable because the supply ports 105 can be formed at high density and the strength and the stability of the liquid discharge head are high.

In addition, since both the processed surface in the depth direction and the processed surface in the horizontal direction are the {100} plane, these processed surfaces are hardly influenced by the change in etching rate caused by concentration of the etchant, temperature, and impurities. Therefore, an effect can be obtained such that it is easy to stably form the structure of the supply ports.

Accordingly, the printing quality can be favorably obtained by the liquid discharge head which can be manufactured with good yield.

(Embodiment 2)

Figure 6A:
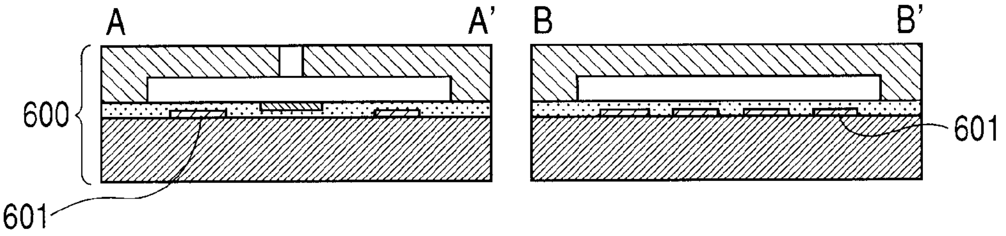
FIGS. 6A, 6B and 6C are cross-sectional views schematically illustrating an embodiment of the invention used to describe the order of processes.
Figure 6B:
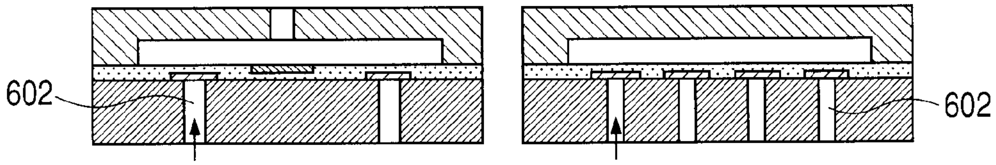
Figure 6C:
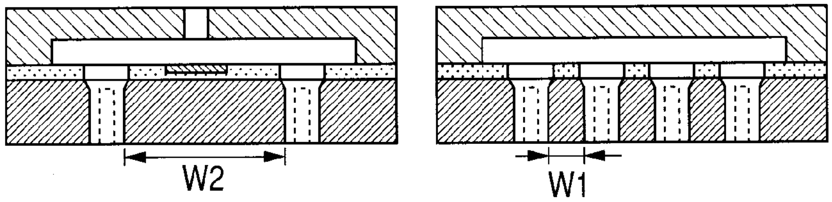

Embodiment 2 will be described with reference to FIGS. 6A to 6C. FIGS. 6A to 6C are diagrams schematically illustrating the cross sections (figures in the left side) taken along the line A-A' and the cross sections (figures in the right side) taken along the line B-B' in FIG. 1 in the order of processes.

First, the substrate 600 provided with a sacrificial layer 601 is prepared (see FIG. 6A). In substrate 600, the sacrificial layer 601 is provided by being isotropically etched when the Si-crystal axis anisotropic etching is carried out. In addition, the sacrificial layer 601 is patterned with a desired size. As the sacrificial layer 601, a metal film such as, for example, aluminum, a polycrystalline Si film, or a porous Si oxide film can be employed.

Next, the guide holes 602 are formed from the rear surface of the substrate (see FIG. 6B). As a method of forming the guide holes 602, the laser process or the dry etching may be employed. In this embodiment, the processing example carried out by the dry etching will be described.

When the etching rate of the sacrificial layer 601 or the etching rate of the passivation film is sufficiently slower than the etching rate of the Si substrate, the guide holes 602 may be formed to reach the sacrificial layer 601 or the passivation film. When the electrically conductive sacrificial layer is used, it can be expected that a shape defect caused by the charged-up substrate when the Si substrate is subjected to the etching process is effectively suppressed.

Further, the guide holes 602 are formed using a photolithography technique such that the two nearest guide holes 602 are aligned in the <100> direction of the Si-crystal axis. The cross-sectional shape of the guide hole 602 when it is viewed in parallel to the surface of the substrate is not limited to a circular shape or a rectangular shape as long as the area of the cross section falls within a range of the sacrificial layer 601 which is patterned on the substrate side in which the flow paths are formed.

Next, similarly to Embodiment 1 described above, the Si-crystal axis anisotropic etching is carried out. At this time, the sacrificial layer 601 is also removed at the same time. Thereafter, the passivation film is removed from the rear surface by chemical etching or dry etching so as to form the independent supply ports which are connected to the flow paths (see FIG. 6C).

Also in the region in which the sacrificial layer 601 is formed, the space is formed as a part of the supply ports. As a result, the ends of the supply ports on the substrate surface side are defined by the patterning shape of the sacrificial layer 601. For this reason, by using the sacrificial layer 601, the positions of the openings of the supply ports on the substrate surface side can be efficiently formed with high accuracy.

Further, the shape of the cross section of the independent supply port in the vertical direction with respect to the substrate surface differs according to a large number of the parameters such as the conditions of the crystal axis anisotropic etching, the pattern of the sacrificial layer 601, and the etching rate of the sacrificial layer 601, but the invention is not limited to these shapes.

(Embodiment 3)

Figure 7A:
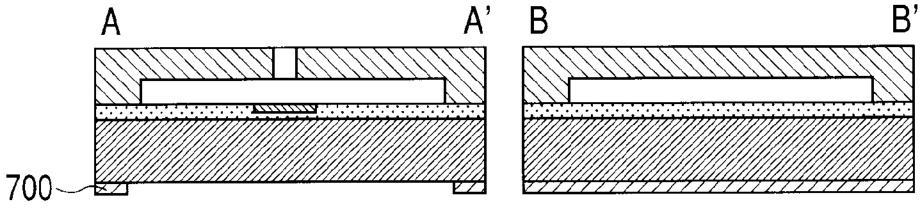
FIGS. 7A, 7B and 7C are cross-sectional views schematically illustrating an embodiment of the invention used to describe the order of processes.
Figure 7B:
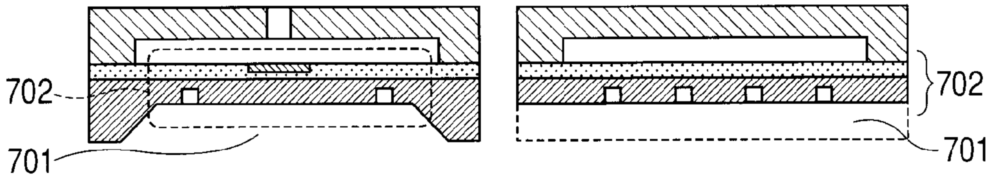
Figure 7C:
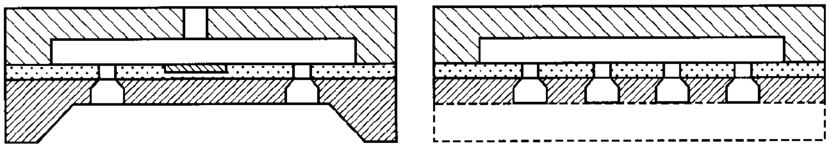

Embodiment 3 will be described with reference to FIGS. 7A to 7C and 8A to 8B. FIGS. 7A to 7C are diagrams schematically illustrating the cross sections (figures in the left side) taken along the line A-A' and the cross sections (figures in the right side) taken along the line B-B' in FIG. 8B.

Similarly to Embodiment 1 described above, the substrate is prepared. In this case, the substrate may be provided with the sacrificial layer or not.

The etching resist layer 700 is patterned on the rear surface of the substrate so as to correspond to the position of the space 701 which becomes the common liquid chamber (FIG. 7A). Thereafter, the Si substrate is removed by etching so as to form the space 701 which becomes the common liquid chamber.

As an etching method of forming the space 701 which becomes the common liquid chamber, the Si-crystal axis anisotropic etching or the dry etching may be employed. The etching resist layer 700 can be formed by properly selecting a material which is suitable to the selected etching method.

When dry etching is employed, the space 701 as the common liquid chamber can have high perpendicularity and shrinkage in chip can be realized. In addition, the arrangement can be performed regardless of the Si crystal axis. Therefore, flexibility in design can be increased. There is an advantage in that the flexibility in design can be increased. In this case, similarly to Embodiment 1, the Si substrate may be prepared in arrangement of FIG. 4.

Figure 8A:
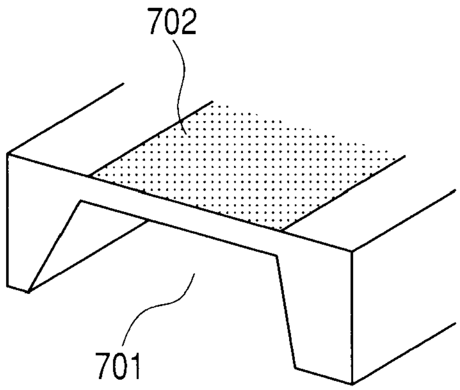
FIGS. 8A and 8B are diagrams schematically illustrating a liquid discharge head which is manufactured according to the invention.
Figure 8B:
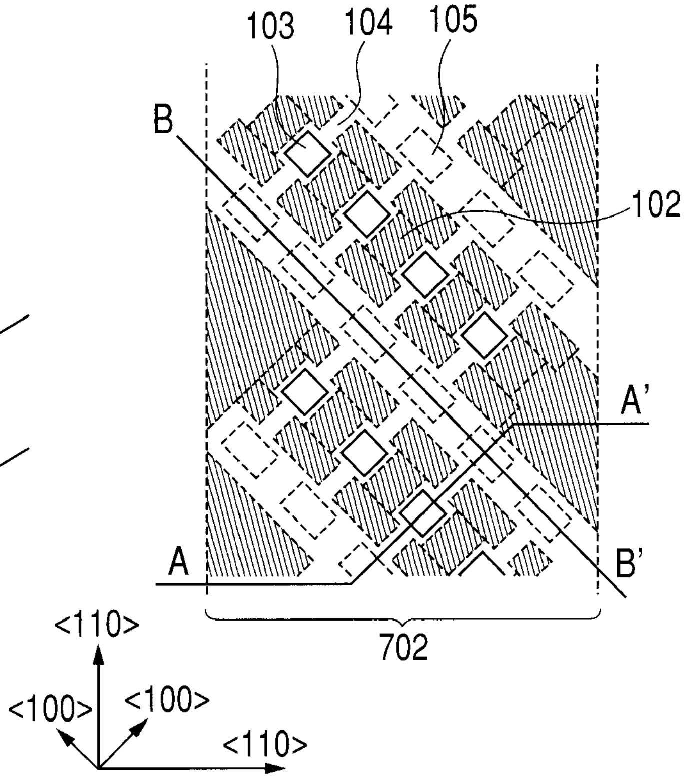
Figure 9:
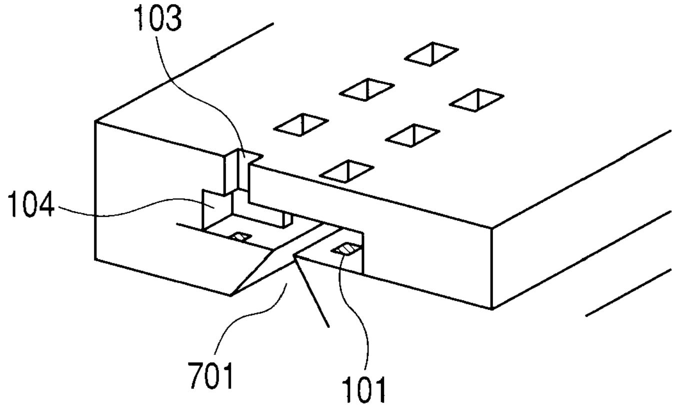
FIG. 9 is a diagram schematically illustrating a typical liquid discharge head in the related art.

In addition, when the Si-crystal axis anisotropic etching is employed, it is possible to achieve simple and highly productive manufacturing. However, the longitudinal direction of the array of the discharge ports is limited to the <110> direction due to the angle of the {111} plane which is exposed by the Si-crystal axis anisotropic etching. Therefore, for example, as illustrated in FIGS. 8A to 8B, the discharge ports, the flow paths, and the independent supply ports may be obliquely aligned on the region 702 which is formed thin in the substrate.

After the space 701 as the common liquid chamber is formed, the independent supply ports are formed on the region 702 which is formed so as to be thin in the substrate (see FIGS. 7B and 7C) similarly to Embodiment 1 and Embodiment 2. Therefore, the space 701 is formed as the common liquid chamber in which at least two or more independent supply ports are connected. Since the independent supply ports are short in its depth direction, the aspect ratio of the processed shape is small when the guide holes are processed, and the accuracy of the processed shape or the tact performance is effectively increased.

Hereinafter, examples according to the invention will be described, but the invention is not limited thereto.

EXAMPLE 1

FIGS. 10A to 10F illustrate a method of manufacturing the liquid discharge head of this example.

Figure 10A:
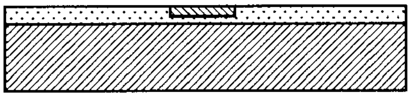

First, the Si substrate was prepared which included the {100} plane and was provided with a heater for discharging the liquid and a semiconductor element for driving and controlling the heater (see FIG. 10A).

A polyether amide 700 using N-methyl-pyrrolidone as a solvent was formed as a film on the rear surface of a wafer by spin coating, and a positive resist was further coated on the rear surface of the wafer. After the positive resist was patterned on the rear surface of the wafer using the photolithography technique, chemical dry etching was performed to remove a portion of the polyether amide layer and then the positive resist was peeled off (see FIG. 10B).

Figure 10D:
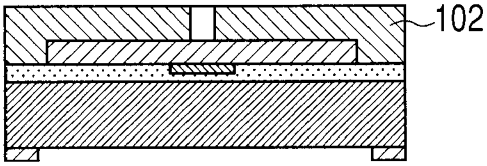
Figure 10B:
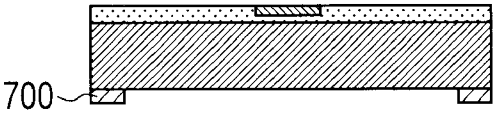
Figure 10E:
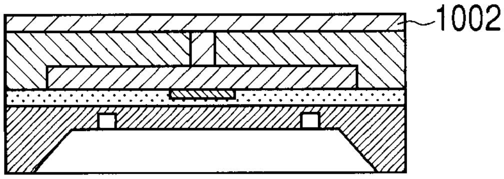
Figure 10C:
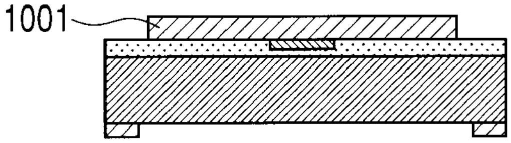
Figure 10F:
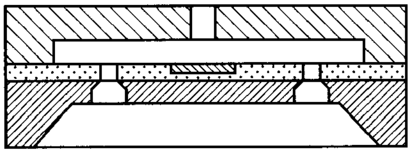

On the wafer surface, a resist was coated which contained poly methyl isopropenyl ketone and served as a mold material 1001 for forming an ink flow path, and then exposure and development were carried out followed by the patterning (FIG. 10C).

Next, a photosensitive epoxy 102 was coated to form an orifice plate, and then patterned by exposure and development so as to form the discharge port (see FIG. 10D).

Thereafter, in order to protect the formed orifice plate, a protective film 1002 made of a rubber resin was coated on the wafer surface and the peripheral portion.

Thereafter, using polyether amide, which was patterned on the rear surface, as the resist and using tetra methyl ammonium hydroxide (TMAH) of 22 wt % as the etchant, the crystal axis anisotropic etching was carried out such that the remaining film thickness of the substrate was 125 μm, so that the space which became the common liquid chamber was formed.

Next, with a laser processing apparatus (article name: “Model 5330”) made by ESI Inc., the two nearest guide holes were formed such that the guide holes were aligned in the <100> direction of the Si crystal axis. The wavelength of the laser beam was 355 nm, the pulse time was 70±5 ns, and the spot shape of the laser irradiation was a circle. The depth of the formed guide hole was 120 μm, and the distance between the tip end of the guide hole and the passivation film was 5 μm. In addition, the width of the Si pillar between the two nearest guide holes was 59 μm (see FIG. 10E).

Thereafter, using tetra methyl ammonium hydroxide (TMAH) of 10 wt % and 80° C. as the etchant, the crystal axis anisotropic etching was carried out on the guide hole so as to form the supply port in which the {100} plane became a wall surface. The supply port was formed so as to reach the passivation film. Further, the typical etching rate of a plane orientation at this time was {100}=0.87 μm/min, {110}=1.28 μm/min.

Thereafter, the polyether amide resin of the rear surface of the wafer was removed by chemical dry etching. Next, the passivation layer was removed by chemical dry etching. Then, the protective film 1002 coated on the wafer surface and the peripheral portion of the wafer was removed by using xylene. Finally, the resist as the mold material 1001 of the ink flow path was removed by using methyl lactate (see FIG. 10F).

As described above, the liquid discharge head provided with the independent supply port and the sub flow path was manufactured.

The width of the Si pillar between the two nearest supply ports of the obtained liquid discharge head was 39 μm, and sufficient strength was exhibited. In addition, the widths of the respective Si pillars were substantially equal to each other, and there were hardly any deviations found.

EXAMPLE 2

Figure 11A:
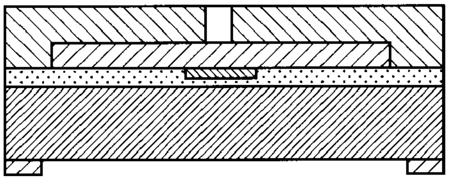
FIGS. 11A, 11B and 11C are cross-sectional views schematically illustrating an embodiment of the invention used to describe the order of processes.
Figure 11B:
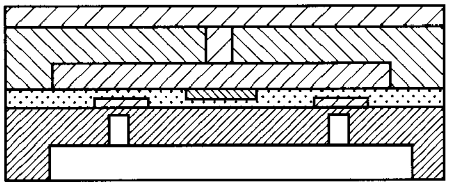
Figure 11C:
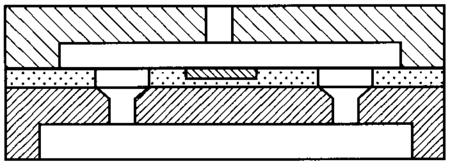
Figure 12:
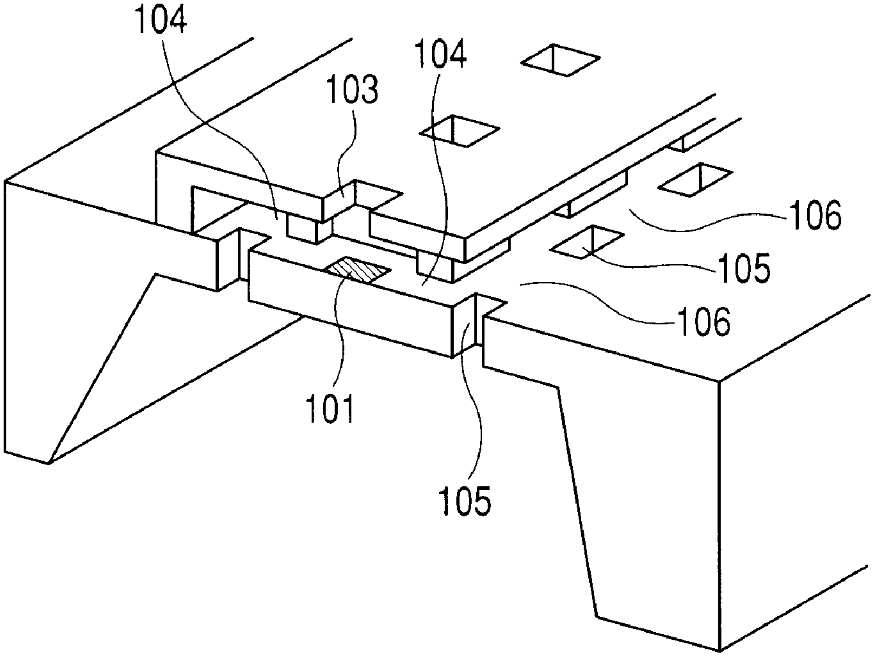
FIG. 12 is a diagram schematically illustrating a liquid discharge head in the related art.
Figure 13:
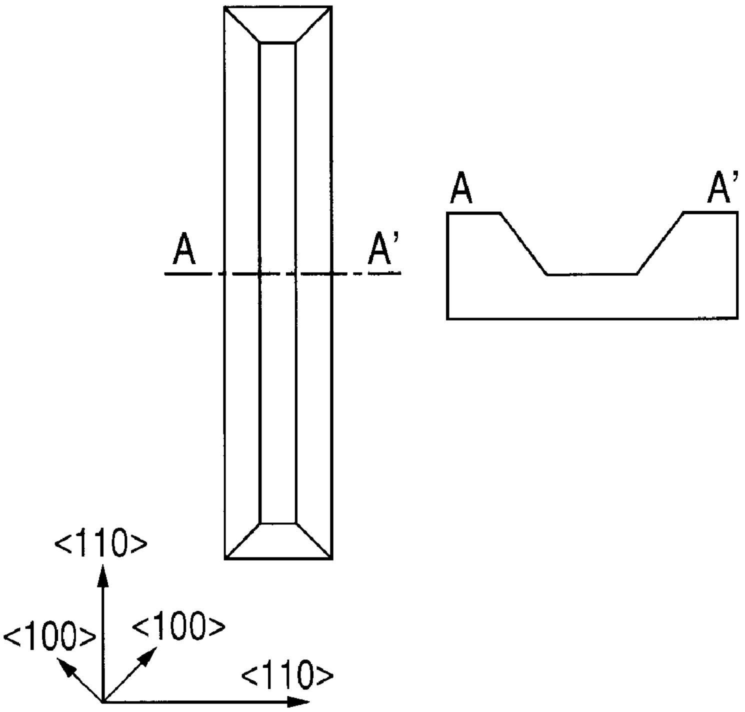
FIG. 13 is a diagram schematically illustrating a common liquid chamber which is typically formed in a liquid discharge head.

FIGS. 11A to 11C illustrate a method of manufacturing the liquid discharge head of this example.

First, the Si substrate was prepared which included the {100} plane and was provided with a heater for discharging the liquid, a semiconductor element for driving and controlling the heater, and an Al film which is the sacrificial layer of the Si-crystal axis anisotropic etching.

The chips of the liquid discharge head were disposed with respect to the crystal orientation of the Si wafer as illustrated in FIG. 4.

In addition, the discharge ports were formed in the same processes as those in Example 1 (see FIG. 11A). Thereafter, in order to protect the formed orifice plate, a protective film made of a rubber resin was coated on the wafer surface and the peripheral portion.

Then, the space was formed as the common liquid chamber by the dry etching in the Bosch manner such that the substrate had a film thickness of 125 μm.

Next, the positive resist was coated on the bottom portion of the space formed as the common liquid chamber by a spray manner.

The positive resist was patterned using the photolithography manner such that the two nearest guide holes were aligned in the <100> direction of the Si crystal axis, and then subjected to the dry etching in the Bosch manner so as to form the guide holes. In the dry etching, Al as the sacrificial layer was used as an etching stopper. The shape of the formed guide hole was a circle, and the area thereof fell within the range of the sacrificial layer. In addition, the width of the Si pillar between the two nearest guide holes was 59 μm (see FIG. 11 B).

Then, using potassium hydroxide (KOH) of 38 wt % and 70° C. as the etchant, the crystal axis anisotropic etching was carried out on the guide hole and the sacrificial layer was removed so as to form the supply port of which the side surface is in the {100} plane.

Further, the etching rate of the {100} plane at this time was 0.64 μm/min, and the etching rate of the {110} plane was 1.30 μm/min.

Thereafter, the polyether amide resin of the rear surface of the wafer was removed by chemical dry etching. Next, the passivation layer was removed by chemical dry etching. Then, the protective film coated on the wafer surface and the peripheral portion of the wafer was removed by using xylene. Finally, the resist as the mold material 1001 of the ink flow path was removed by using methyl lactate (see FIG. 11C).

As described above, the liquid discharge head was manufactured.

The width of the Si pillar between the two nearest supply ports of the obtained liquid discharge head was 39 μm, and a sufficient strength was exhibited. In addition, the widths of the respective Si pillars were substantially equal to each other, and there were hardly any deviations found.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-323787, filed Dec. 19, 2008, which is hereby incorporated by reference herein in its entirety.

What is claimed is:

1. A method of manufacturing a substrate for a liquid discharge head which includes an Si substrate which is provided with a liquid discharge energy generating element, a line provided on a first surface to electrically connect the liquid discharge energy generating element and a semiconductor element for driving the liquid discharge energy generating element, and liquid supply ports which are provided to pass through the Si substrate from the first surface to a rear surface thereof so as to supply a liquid to the liquid discharge energy generating element, the method comprising:

forming a plurality of concave portions on the rear surface of the Si substrate of which a plane orientation is {100} so as to be aligned in rows along a <100> direction of the Si substrate, the concave portions facing the first surface so that two concave portions which are closest to each other sandwich a portion of the Si substrate which is present under the line, if an extending direction of the plurality of concave portions from the first surface to the rear surface is assumed downward; and forming a plurality of the liquid supply ports by carrying out a crystal axis anisotropic etching on the Si substrate through the concave portions using an etching liquid of which an etching rate of the {100} plane of the Si substrate is slower than an etching rate of a {110} plane of the Si substrate.

2. The method according to claim 1, wherein the etching liquid contains tetra methyl ammonium hydroxide (TMAH).

3. The method according to claim 1, wherein the etching liquid contains potassium hydroxide (KOH).

4. The method according to claim 1, wherein the Si substrate is subjected to a laser process so as to form the concave portions.

5. The method according to claim 1, wherein the Si substrate is provided with a sacrificial layer on the first surface, and wherein the sacrificial layer is isotropically etched by the etching liquid.

* * * * *